United States Patent

[11] 3,633,278

[72] Inventor Benjamin Ron
  10 Sanhedrin St., Tel Aviv, Israel
[21] Appl. No. 35,388
[22] Filed May 7, 1970
[45] Patented Jan. 11, 1972

[54] MICROMETER ADOPTED TO SERVE AS A LINEAR MEASURING TOOL
  2 Claims, 2 Drawing Figs.
[52] U.S. Cl. .................................................. 33/167,
  33/141 D, 33/141 E, 33/164 R
[51] Int. Cl. ...................................................... G01b 3/18,
  G01b 5/00, G01b 7/04
[50] Field of Search ........................................ 33/141 R,
  141 C, 141 D, 141 E, 164 R, 164 B, 164 C, 164 D,
  167, 169 B

[56] References Cited
UNITED STATES PATENTS
| | | | |
|---|---|---|---|
| 3,060,586 | 10/1962 | Yamamoto | 33/167 |
| 3,123,917 | 3/1964 | Haluska | 33/167 |
| 3,166,850 | 1/1965 | Yamuzawa | 33/167 |

Primary Examiner—Leonard Forman
Assistant Examiner—Steven L. Stephan
Attorney—F. A. Krusemark

ABSTRACT: A measuring wheel with circumference 100 times larger than the distance change caused by a single revolution of a micrometer's rotary handle to which the measuring wheel is fit to be attached. The circumference of the wheel is frictionally engageable to work surface.

The combination of the wheel attached to micrometer's rotary handle adapts the micrometer to serve as a linear roller measuring device.

PATENTED JAN 11 1972　　　　　　　　　　　3,633,278

INVENTOR
BENJAMIN RON
BY

MICROMETER ADOPTED TO SERVE AS A LINEAR MEASURING TOOL

SUMMARY OF THE INVENTION

The embodiment of this invention comprises a ring fitted in a suitable groove over the rotary handle of a micrometer.

The ring, which serves as a measuring wheel, is made of elastic material, has a rectangular cross section, a frictionally engageable circumference and it is square and concentric with the rotary handle axis of rotation. Ring's circumference throughout the specification and claims of this application is the effective circumference of the ring as it is being rolled over the work surface being measured, and it is equal to the linear distance the ring is rolled over during one revolution of the ring and the rotary handle it is attached to.

Ring's circumference is 100 times larger than the change of distance between micrometer's measuring jaws caused by one revolution of the rotary handle. This relation of circumference to jaw's advancement due to single turn of the rotary handle enable the user to read the micrometer's scale, multiply the result by 100 and get the distance of the path the ring rolled over.

This simple additional detail doubles the usage of the micrometer at a minimal price penalty.

It is obvious that other instruments like for example, a depth gauge employing a micrometer screw could be adapted in a similar manner to serve as a measuring roller rule.

DESCRIPTION OF THE DRAWING

In the accompanying drawings.

Referring to the drawings, in which identical parts are indicated by the same numerals in the various drawings, a micrometer, according to my invention, is indicated by numeral 10. Measuring jaws are indicated by numerals 11 and 12.

Figure 1:
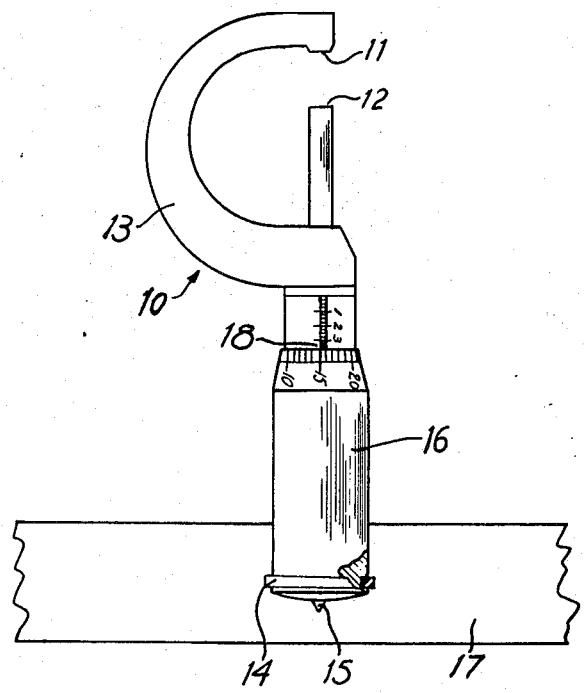
FIG. 1, is a side view of a micrometer carrying on its rotary handle a rubber ring adapting micrometer to function as a roller measuring device.
Figure 2:
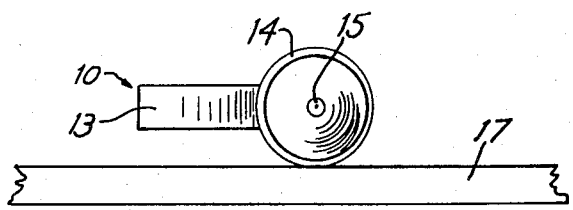
FIG. 2, is an under view of the micrometer shown in FIG. 1.

A micrometer ark is indicated by numeral 13. A rubber ring of square cross section serving as a measuring wheel is indicated by numeral 14 and aiming tip 15 is located in the center of the bottom of a rotary handle 16.

OPERATION

The measurement is done holding the ark 13 and bringing the ring 14 in contact with the beginning of the path to be measured, and then by moving the micrometer by the ark 13 causing the ring 14 to roll on this pass. This causes the handle 16 to also rotate, therefore, the jaws 11 and 12 open and the reading on a scale 18 is changed.

The conventional micrometer is built so the change in the scale's 18 reading, is equal the change of distance between the jaws 11 and 12. The length of the path measured on work 17 is equal the number of turns traveled by ring wheel 14, multiplied by the ring 14 circumference, however, since in the shown embodiment we establish a ration of the ring's 14 circumference to be one hundred times larger than the change of distance of the jaws 11 and 12 caused by a single turn of the rotary handle 16, the change of reading we will get on the scale 18 will be one-hundredth (0.01) of the length of the path over which the ring 14 has rolled.

The operator of this device should hold the ark 13 at same relative angle with surface of object being measured at the beginning and at the end of measurement. For example, if the ark is held square with surface being measured at the beginning of measurement it should be held square with this surface at end of measurement.

To make reading easier, the user of this invention would probably prefer to start at a zero reading at the scale 18 and then whatever he reads on the scale 18 at the end of measurement, multiplied by one hundred would be the length traveled by the ring 14.

The aiming tip 15 is to help reading the position of the micrometer 10 relative to the work to be measured.

While this invention has been described and illustrated in connection with specific embodiment, it is, of course, understood that various changes may be made in the form, details and proportion of various parts without departing from the scope of my invention.

I claim:

1. A micrometer caliper having a linearly movable spindle driven by the rotation of a rotatable handle and a measuring ring attached to the handle of said micrometer, said measuring ring having an inner and an outer circumference, said outer circumference being one hundred times larger than the distance change between measuring jaws of said micrometer due to a single revolution of said micrometer's rotary handle, said measuring ring being made to be attached to said handle in such a manner that it will rotate together with said rotary handle while said measuring ring is rolled over a path being measured, said measuring ring being square as seen in a cross section taken along a radial plane from the principal axis and being concentric with said rotary handle's axis of rotation and said inner circumference being sized to frictionally engage said rotary handle.

2. As in claim 1, wherein said measuring ring is made of flexible material seated in a suitable groove in said micrometer's rotary handle.

* * * * *